2,893,274
TOOL HOLDER

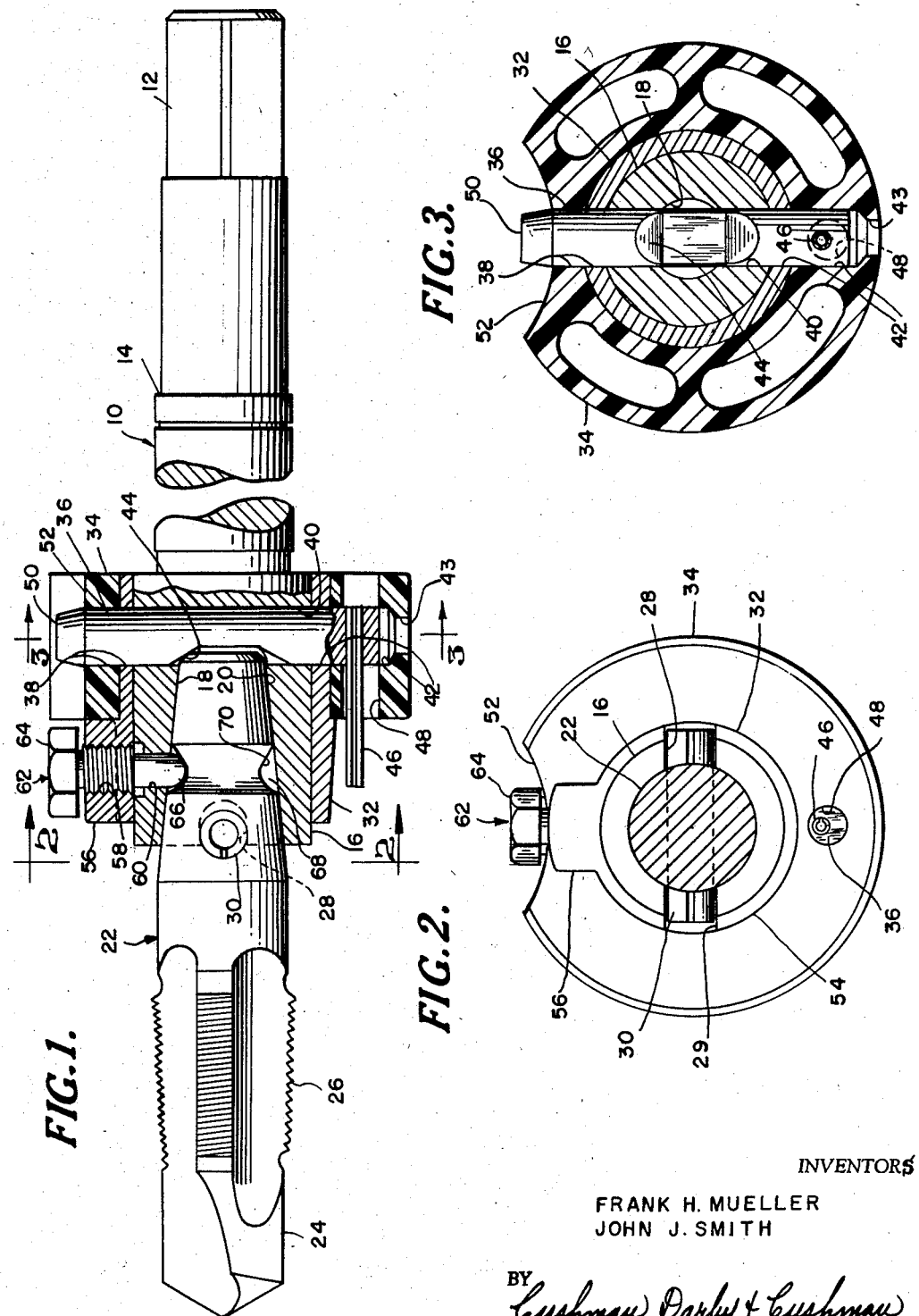
July 7, 1959    F. H. MUELLER ET AL    2,893,274
TOOL HOLDER
Filed July 9, 1957
INVENTORS
FRANK H. MUELLER
JOHN J. SMITH
BY Cushman, Darby & Cushman
ATTORNEYS United States Patent Office 2,893,274
Patented July 7, 1959

Frank H. Mueller and John J. Smith, Decatur, Ill., assignors to Mueller Co., Decatur, Ill., a corporation of Illinois Application July 9, 1957, Serial No. 670,755

4 Claims. (Cl. 77—55)

This invention relates to drilling machines, and more particularly to improvements in tool holders for the boring bars of such machines, as shown, for example, in U.S. Patents Nos. 2,291,979 and 2,314,013, both to Mueller et al.

The tool holders disclosed in the foregoing patents comprise a tapered socket in one end of a boring bar for reception of the complementary shank of a tool. The tool has a longitudinal slot or a keyway in its shank for the reception of a key that projects from the holder into the socket. The tool is retained in the socket by a set screw that extends into a dished seat in the side of the tool shank.

While such tool holders have been satisfactory for their intended purpose, they possess certain disadvantages. For example, in some instances the tool is driven by the engagement between the end of the set screw and the seat in the tool shank, rather than by a driving engagement between the socket key and the keyway in the tool shank. On such an occurrence, the inner end of the set screw becomes badly marred, in some instances to such an extent that the screw must be replaced. Of greater importance is the fact that the driving engagement between the set screw and its seat in the tool shank actually bulges the shank on one side of the seat. Such a bulge impairs the accurate centering taper of the shank to such an extent that it will not fit perfectly in the tool holder socket. Consequently, the tool will run off center, a most undesirable result. Additionally, in the key and keyway driving arrangement shown in the foregoing patents, the "drive" of the tool takes place between the ends of the accurately tapered "centering" part of the tool shank, and it readily will be seen that such a key and keyway drive might, when impact type torques are encountered, even tend to bulge the shank at one side of the keyway therein, again ruining the accurate centering taper to such an extent that the tool will run off center.

Accordingly, it is an object of this invention to provide an improved driving and tool-retaining arrangement for a tool holder of a boring bar, wherein there will be no possibility of ruining the accurate centering taper of a tool shank.

The boring bars shown in both of the foregoing patents also have a centering or bearing annulus or collar mounted on the tool holder portion of the boring bar for centering and stabilizing engagement within a cylindrical portion of the drilling machine while the tool is performing its initial drilling operation. As disclosed in the above mentioned Patent No. 2,314,013, the bearing annulus or collar is retained on the head or tool holder portion of the boring bar by a tool-dislodging knock-out pin that extends through diametrically aligned apertures in the collar and in the head of the boring bar.

It is another object of this invention to provide an improved arrangement for retaining a centering collar on the head of a boring bar by means of a knock-out pin.

The tool-retaining set screw shown in both of the foregoing patents has threaded engagement with the integral head of the boring bar. Since the operations performed with drilling apparatus of the type with which this invention is concerned require frequent replacement of tools, the set screw threads on the screw and on the bar frequently become worn to such an extent that even replacement of the bar, as well as the screw, becomes necessary.

Consequently, it is another object of this invention to provide a tool-retaining set screw arrangement wherein the retaining threads for the set screw are formed in a readily replaceable part that is relatively inexpensive as compared to the cost of a boring bar.

Other objects and advantages of the invention will become evident from the following description and accompanying drawings in which:

Figure 1 is a side view, partly in vertical section, of a boring bar having a tool holder embodying this invention, and with a tool being shown mounted in such holder.

Figure 2 is a sectional view taken substantially on lines 2—2 of Figure 1.

Figure 3 is a sectional view taken substantially on lines 3—3 of Figure 1.

Referring now to the drawings, there is shown an elongated cylindrical boring bar 10 having a squared aft end portion 12, for engagement by a turning tool, and a shoulder 14 somewhat in advance of the squared portion for engagement by an abutment collar (not shown) to advance the bar in a manner well disclosed in the previously mentioned patents. The bar 10 usually is formed of steel, and at its forward end is provided with an enlarged cylindrical tool holder portion or head 16. At its forward end the head 16 is provided with a concentric tapered socket 18 for reception of and accurate centering engagement with the correspondingly tapered shank 20 of a tool, such as the combined drill and tap 22 shown in Figure 1 of the drawings, such tool having a forward drilling portion 24, an intermediate tapping portion 26, and the tapered shank.

The rim of the socket 18 in the tool holder 16 is provided with diametric notches 28 for the reception of the opposite ends of a drive pin 30 extending transversely through the tool shank 20. Preferably, this pin 30 is of the "roll" type and consists of a longitudinally split cylindrical sleeve that is slightly oversized with respect to a transverse bore in the tool shank 20 but is slightly tapered at one end for a drive fit in such bore. The engagement between the ends of the drive pin 30 and the notches 28 in the rim of the tool holder socket 18 serve to drive the tool 22, and it will be noted that such "drive" of the tool is effected at the forward end of the tapered portion of the tool shank 20. Additionally, it will be seen that the driving force imparted to the tool by the drive pin and notch arrangement has no tendency to detrimentally affect the accurate centering taper of the tool shank 20.

Concentrically mounted on the head 16 of the boring bar 10 is a centering or bearing annulus that preferably is formed in two parts, one a sleeve or bushing 32 of accurately machinable metal, such as brass, and the other a collar 34, of less length than the sleeve, and of a wear-resistant smooth material having a low coefficient of friction, such as nylon. Preferably, the collar 34 is molded directly onto the bushing 32. As described more in detail in the aforementioned patents, the annulus, i.e., the collar 34, has a centering and stabilizing engagement within a reduced cylindrical bearing surface of a drilling machine during at least the initial part of a drilling operation. Preferably, the forward end of the bushing 32 is diametrically notched, as at 29, in alignment with the notches 28 to accommodate an overly long drive pin 30.

The annulus is retained on the head 16 of the boring bar 10 by a tool-dislodging knock-out pin 36 that extends through radial bores 38 in one side of the bushing 32 and the collar 34, an aligned diametric bore 40 in the boring bar head 16 at the bottom of the socket 18, and into aligned radial bore 42 in the other sides of the bushing and the collar. The outer end of the bore 42 preferably is reduced in diameter, as at 43. Between its ends the knock-out pin 36 is notched on one side to provide an inclined camming surface 44 engageable with the rear end of the shank 20 of the tool 22 when the latter is disposed in the tool holder socket 18. The knock-out pin 36 is retained in position in the tool holder 16, while permitting a limited degree of reciprocating movement of the pin, by a lateral projection or trigger 46 on the pin that projects through an enlarged opening 48 which intersects the bore 42 in the collar 34 and extends generally longitudinally of the boring bar 10. Preferably, the lateral projection 46 is in the form of a "roll" pin that has a drive fit in a transverse bore in the knock-out pin 36.

The trigger 46 limits outward movement of the knock-out pin 36 so that its outer end 50 cannot project outwardly beyond the peripheral bearing surface of the bearing collar 34. Hence, the collar 34 has a recess 52 at the outer end of the bore 38 so that the pin end 50 can be hit with an impact tool (not shown) to dislodge the toll 22 from the socket 18 by the camming surface 44 without the necessity of using a punch. The trigger 46 also is used to move the knock-out pin 36 to its outermost position when inserting a tool in the socket 18, so that the camming surface 44 will not interfere with the inner end of the tool shank 20 and prevent the latter from fitting snugly in the socket 18. In the event of damage to the trigger 46, a punch (not shown) can be inserted into the outer end of the bore 42 to drive the pin 36 back.

At its forward end the bushing 32 is provided on one side thereof with an enlarged portion or boss 56. Extending radially through the boss is a tapped aperture 58 in radial alignment with a transverse smooth bore 60 in the head 16 of the bar 10 that extends through the side wall of the socket 18. Threadedly engaged within the tapped aperture 58 is a set screw 62 having a non-circular, e.g., hexagonal, head 64 and a reduced unthreaded inner portion that extends through the bore 60 and terminates in a rounded inner end 66. The tool shank 20 is provided with a circumferential groove 68 within which fits the inner end 66 of the set screw 62 in order to retain the tool 22 in the socket 18. The side wall 70 of the groove 68 which faces the cutting portions 24 and 26 of the tool 22 is frusto-conical or provided with a greater radius of curvature than the rounded end 66 of the set screw so that engagement between the latter and such side wall 70 exerts a camming action effective to force the tool shank 20 more tightly into the socket 18. In this connection, however, it will be noted that the engagement between the set screw 62 and the side wall 70 of the groove 68 serves only to exert an axial force on the tool 22 for retaining purposes only, and does not exert any rotative or driving force on the tool. Thus, the set screw 62 cannot drive the tool 22 and so mar or upset its accurately tapered shank 20.

It also will be seen that should frequent usage ruin the threads in the bushing aperture 58, the bearing annulus readily can be replaced by pulling out the trigger 46 to permit removal of the annulus-retaining knock-out pin 36.

It thus will be seen that the objects of this invention have been fully and effectively accomplished. It will be realized, however, that the specific embodiment illustrated and described for the purpose of disclosing the principles of this invention may be varied without departing from such principles. Therefore, this invention includes all modifications which are encompassed within the spirit and scope of the following claims.

We claim:

1. In a drilling machine the combination comprising: a boring bar having a tapered circular socket at one end thereof to receive the shank of a tool and notch means in the rim of said socket; a tool having a tapered circular shank receivable in said socket and an endless circumferential groove in said shank; a lateral driving projection on said shank receivable in said notch means; and set screw means on said bar extendible into said socket for tool-retaining engagement within said shank groove, that side wall of said groove which faces the work-engaging end of said tool being inclined for camming engagement by said set screw means in order to pull said shank into tight engagement within said socket.

2. In a drilling machine the combination comprising: a boring bar having a circular socket at one end thereof to receive the shank of a tool and notch means on the rim of said socket; a tool having a circular shank receivable in said socket and an endless circumferential groove in said shank; a lateral driving projection on said shank receivable in said notch means; set screw means on said bar extendable into said socket for tool-retaining engagement within said shank groove, said bar having a transverse bore extending through a side wall of said socket, intersecting the latter adjacent the bottom thereof, and extending at least partially through the opposite side wall of said socket; a knock-out pin reciprocable in said bore and having an impact-receiving end extending exteriorly of said bore; means defining an inclined shoulder on said pin engageable with the inner end of said tool shank to cam said tool out of said socket; means defining an opening in said bar extending inwardly from said one end thereof in spaced relation to said tool-receiving socket and intersecting said transverse bore; and a lateral projection on said pin extending through said opening to the exterior thereof for manual manipulation to reciprocate said pin.

3. In a drilling machine the combination comprising: a boring bar having a tapered circular socket in one end thereof to receive a tool shank, said socket having a pair of diametrical recesses in the rim thereof to drivingly receive the ends of a drive pin extending through the shank; a guiding annulus removably mounted on said bar one end; and set screw means threadedly engaged with said annulus only and extendible into said socket for tool-retaining engagement within a circumferential groove in the tool shank.

4. A cutting tool comprising: a cutting portion and a tapered circular shank for reception in a mating socket of a tool holder; a lateral projection on said shank for driven engagement within a corresponding notch in the rim of the socket; and means defining an endless circumferential groove in said shank between said projection and the end of said shank for tool-retaining engagement by set screw means on the holder, that side wall of said groove which faces said cutting portion being inclined for camming engagement by said set screw means in order to pull said tool into tight engagement within said socket.

References Cited in the file of this patent

UNITED STATES PATENTS

| | | |
|---|---|---|
| 2,291,979 | Mueller et al. | Aug. 4, 1942 |
| 2,314,013 | Mueller et al. | Mar. 16, 1943 |
| 2,761,298 | Jarvis | Sept. 4, 1956 |
| 2,761,688 | Mueller | Sept. 4, 1956 |